United States Patent [19]
Philippides

[11] 4,293,949
[45] Oct. 6, 1981

[54] CLOCK INVARIANT SYNCHRONIZATION FOR RANDOM BINARY SEQUENCES

[75] Inventor: Constantinos Philippides, Columbia, Md.

[73] Assignee: The United States of America as represented by the Secretary of the Navy, Washington, D.C.

[21] Appl. No.: 89,672

[22] Filed: Oct. 30, 1979

[51] Int. Cl.³ .................. G06F 11/00; H03K 13/34
[52] U.S. Cl. .................................. 371/6; 307/269; 328/63
[58] Field of Search ............... 371/6; 307/208, 269; 328/63, 109–111, 119; 329/104; 343/6.5 R, 6.5 LC, 6.5 SS, 17.1 PW

[56] References Cited
U.S. PATENT DOCUMENTS

| 3,602,828 | 8/1971 | Kurzweil, Jr. et al. | 328/63 X |
| 3,683,288 | 8/1972 | Curry | 329/104 |
| 3,916,084 | 10/1975 | Toole | 328/63 X |
| 3,986,126 | 10/1976 | Gindi et al. | 307/269 X |
| 4,012,697 | 3/1977 | Ballinger | 328/63 |
| 4,122,441 | 10/1978 | Robinson et al. | 371/6 |

Primary Examiner—Jerry Smith
Attorney, Agent, or Firm—R. S. Sciascia; A. L. Branning

[57] ABSTRACT

The present invention relates to method and apparatus for performing missile identification (MID) and decoding messages communicated to an identified missile without the use of a synchronous internal clock.

14 Claims, 7 Drawing Figures

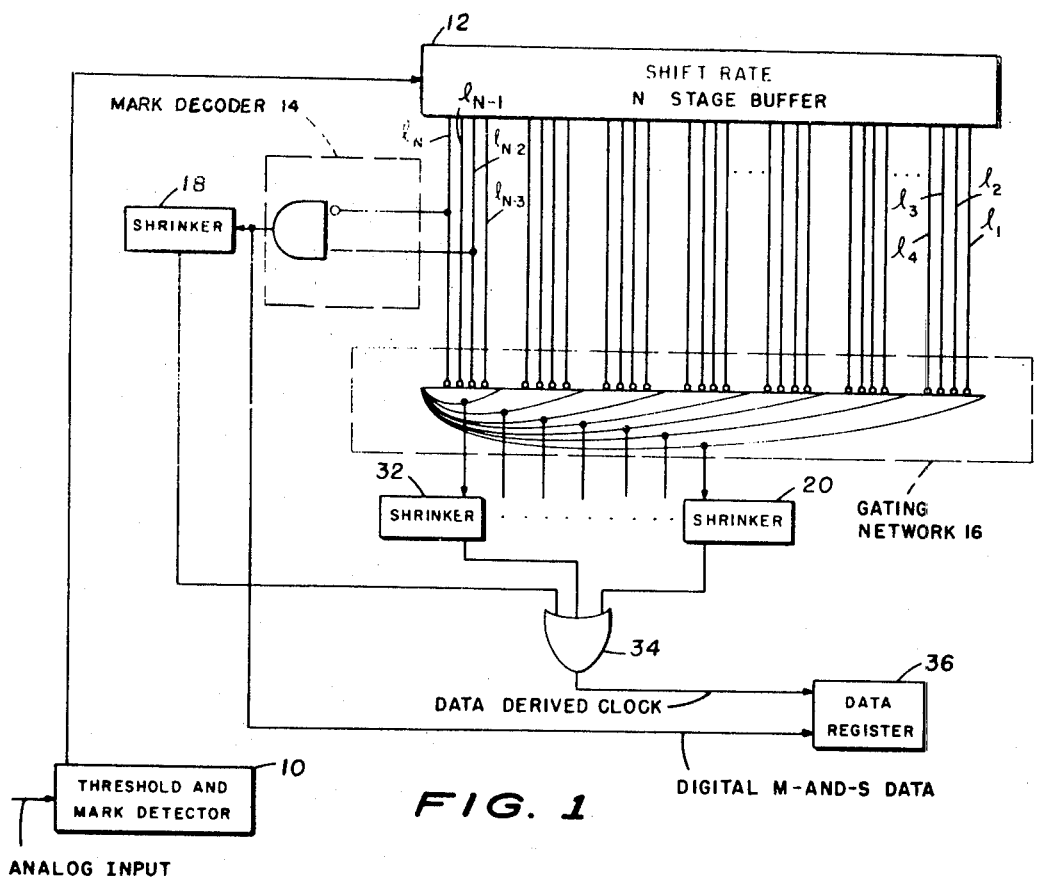
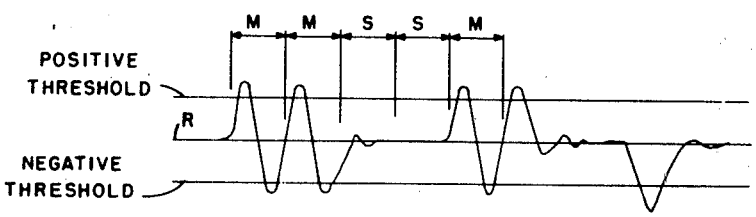
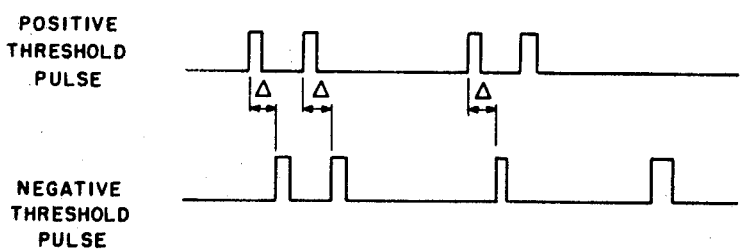

CLOCK INVARIANT SYNCHRONIZATION FOR RANDOM BINARY SEQUENCES

FIELD OF THE INVENTION

The present invention relates to circuitry which dissects data in mark and space format into a plurality of digital bits which can be compared to determine if a valid mark or space exists, the detection of a mark at any time during transmission leading to the decoding of a valid mark or space and the generation of a clock pulse.

TECHNOLOGICAL CONTEXT OF THE INVENTION

A number of patent references exist which are directed to long-range data transfer communication schemes. U.S. Pat. No. 3,341,845 (invented by Deman) discloses such a system. One of the objects mentioned in Deman is to provide means for reliably and simply synchronizing the processing of digitally coded signals. Deman uses a split phase pulse code modulation system wherein transitions which result in a mark or space bit, as opposed to the full level changes between marks and spaces, are of significance. To effect desired coding, Deman employs a digital filter which measures the time interval between phase shifts in the signal modulation. Where there is one phase shift within a time interval range of 50 to 150 microseconds, the digital filter generates the output on one of its lines. When two phase shifts are sensed over a range of 150 to 250 microseconds, a pulse is generated on another output line of the digital filter. The two phase shift signal clocks an element into which the output from the 50 to 150 microsecond section of the digital filter enters as data. Deman is highly dependent on the time interval between phase shifts. Should a mark or space be followed by a signal which is either less than 50 microseconds or more than 250 microseconds, the digital filter provides a "clear" input to the element receiving the data. In instances where there are transmission delays, noise, or interference, and signal transitions are either lost or added, the entering of valid data may be prevented. In accordance with Deman, a data transmission corresponding to a mark which is followed 300 microseconds later by a second and third data transition which are 50 microseconds apart, would result in a no-data output despite the fact that two marks and maybe more data may have been transmitted. It should also be noted that Deman employs an oscillator and a phase lock loop to synchronize its data. There is however no provision for deriving the clock from the data itself. To be sure, Deman requires a "start" bit to effect clocking. Thus, although Deman provides a train of synchronizing pulses, it does not provide for clock invariant synchronization. Further, not all valid data will be entered and not all invalid data will be blocked in accordance with Deman.

Another reference worthy of note was invented by Davenport et al and issued as U.S. Pat. No. 3,053,478. This reference discloses a missile interrogation system which uses the time-coincidence between the two pulses for determining if a valid signal has been received. Simply, Davenport et al provides for the generation of a time-reference pulse whenever a given sequence or order of pulses are received from the transmission source, that time-reference pulse being measured against another pulse in the received series of pulses for a desired time-delay therebetween. If the latter, "jitter" pulse follows the time-reference pulse by a predetermined interval, an information output is allowed by the circuit. Davenport et al relies on pulse train time modulation as a mode of information conveyance. It is not directed to a mark-and-space data format scheme. Davenport et al provides three steps in its procedure: first, a pulse-train is sensed for proper sequence of pulses; second, a reference pulse is generated if the sequence is proper; and third, the time-reference pulse is compared in time to a pulse in the pulse train to determine if the time interval therebetween is a pre-set duration. If the interval is correct, flight information is then conveyed. The length of the pulses themselves, because the system is not directed to a mark-and-space format, are of no importance. The Davenport et al system as embodied does not detect, decode, or synchronize random binary data inputs to derive clock pulses. To be sure, the prior art system does not even generate clock pulses and has no reason to do so. Two other references, U.S. Pat. No. 3,667,054 and U.S. Pat. No. 3,156,895 disclose decoding schemes similar to that of Davenport et al. The former employs pulse-train modulation and the latter employs coincidence detection. Neither of these references, however, derive clock pulses from the data.

SUMMARY OF THE INVENTION

The present invention represents a marked improvement over the prior art by deriving a clock pulse whenever a valid data signal is received in mark-and-space format. It is an object of the invention to provide a clock whenever a valid bit of data is received even if the data is somewhat adulterated, delayed, or interfered with. That is, the condition of the signal surrounding a valid data bit will not affect the detection and clocking in of valid data.

The present invention provides a dual safeguard which assures that only valid data is clocked to subsequent data processing elements. First, a threshold detector is provided which examines a mark-and-space encoded analog waveform which generates two pulse sequences one corresponding to time periods where the waveform exceeds a positive threshold in a positive fashion and another to those time periods where a negative threshold is exceeded in the negative direction. By measuring the interim of time between each positive threshold pulse and negative threshold pulse, where there is no positive threshold pulse therebetween, a determination can be made if the original waveform actually transmitted a valid mark waveform. Where the interval is correct, a coincidence pulse is generated which may indicate a mark. A second safeguard of the invention provides for a dissection of the coincidence pulse by sampling it at a rate much higher than the frequency of the waveform transmitted. For example, for each waveform cycle, four samples or more could be taken to determine if the coincidence pulse has characteristics similar to those of a mark pulse. By properly gating the samples, detected marks and spaces can be used in generating corresponding clocks. Such derived clock pulses can be fed together with the threshold decoded mark and space data into another data processing element like a shift register. It is an object of the present invention to provide the derivation of clock pulses from the data itself in a way that prevents the clocking of data when there is neither a mark nor a space but to provide a clock pulse whenever there is a valid mark or space.

It is another object of the present invention to dissect the mark-and-space data by sampling it at a rate at least four times greater than the data frequency.

It is still a further object of the invention to provide a gating network wherein the data is constantly analyzed for marks, such that each mark detected generates a clock pulse and each space generates a clock pulse. It is still another object of the present invention to detect valid bits of information and reject any signal induced due to transmitter instabilities, coherent or incoherent noise, electronic countermeasure perturbation, and phase errors.

It is yet still another object of the present invention to provide clocking wherein the necessity to start a clock in synchronization with the detection of the presence of data is obviated. The invention eliminates false startups and is immune to transmitter turn-on phase modulation characteristics which can introduce false initial bits into the data stream.

DESCRIPTION OF THE DRAWINGS

FIG. 1 shows a block diagram of the present invention.

FIGS. 2, 3, and 4 show, in signal form the operation of the threshold and mark detector of the invention.

DESCRIPTION OF THE INVENTION

Figure 5:
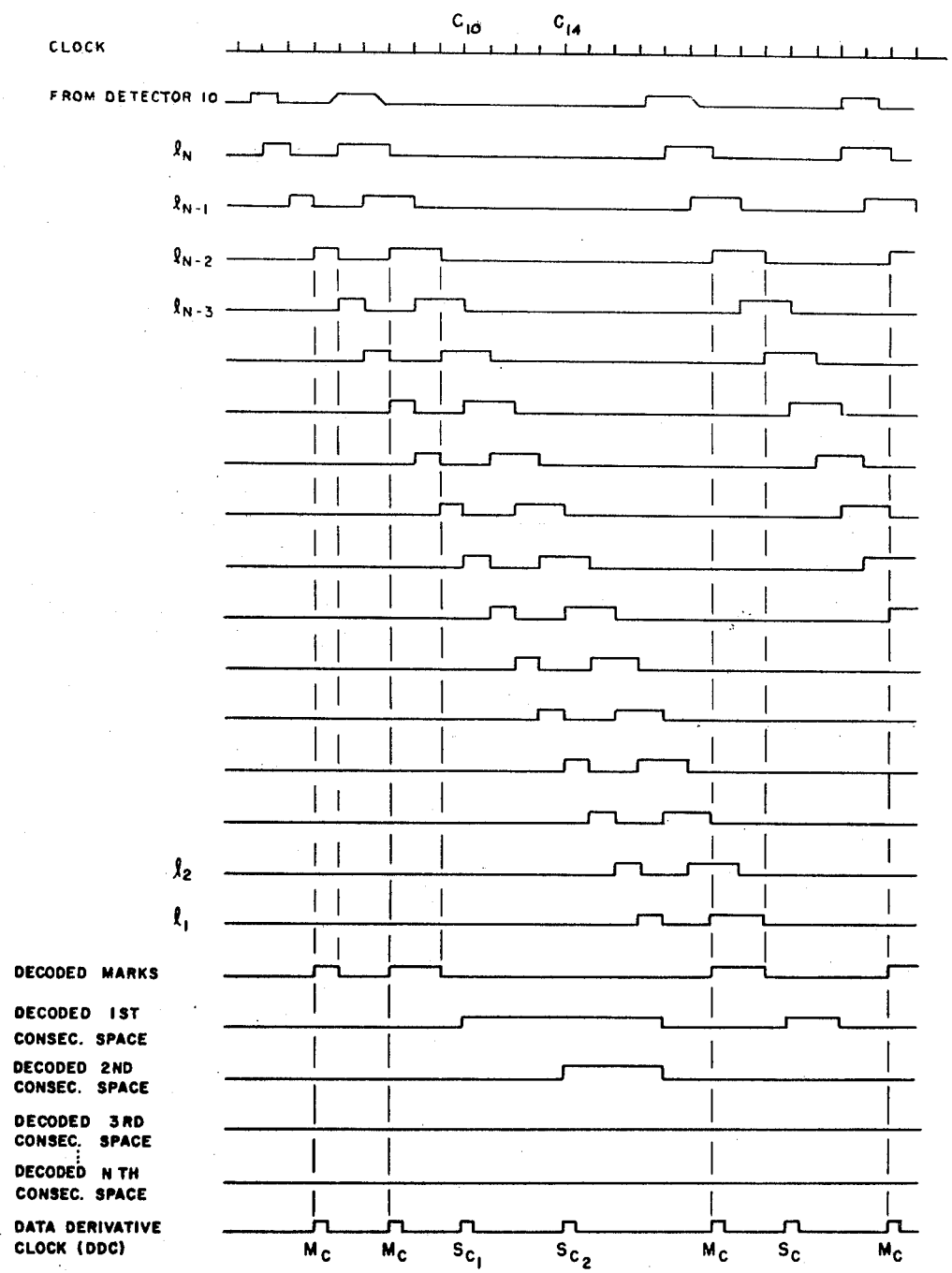
FIG. 5 is a timing diagram showing how the embodiment of FIG. 1 generates data derivative mark clocks and space clocks.

Referring to FIG. 1, analog video input is shown entering a threshold and mark detector 10. The threshold and mark detector 10 provides an analysis of the analog video to determine where data in the form of a mark is present. The operation of the threshold and mark detector 10 is made clear in FIGS. 2 through 4.

Referring to FIG. 2, the analog video input is shown as a sinusoidal signal making excursions about a reference line R. In addition to reference line R, there is a positive threshold and a negative threshold which are selected such that the signal excursion of transmitted marks will exceed the positive and negative threshold when such mark is present. As seen in FIG. 2, the absence of a sinusoidal cycle which exceeds the positive and negative threshold levels corresponds to a space. In the threshold and mark detector 10, two sets of pulses are generated. The first corresponds to a positve threshold pulse which is generated each time the transmitted signal exceeds the positive threshold. Likewise, a negative threshold pulse is generated whenever the negative threshold is exceeded by the transmitted analog video signal. The sinusoid corresponding to a mark has predetermined characteristics in addition to its amplitude. One characteristic, of course, is the period of the cycle. By measuring the time delay between a positive threshold pulse and a negative threshold pulse, both the amplitude and periodicity characteristics of the analog input are revealed. The threshold in mark detector 10, in conventional fashion, employs a filter which measures the time delay of a negative threshold pulse which follows a positive threshold pulse. The delay is measured only between a positive threshold pulse and an adjacent negative threshold pulse where no other pulses are present therebetween. Where the negative threshold pulse follows the positive threshold pulse by a time $\Delta$, a coincidence pulse is produced by the threshold and mark detector 10, thereby indicating the presence of a mark as is shown in FIG. 4.

Referring again to FIG. 1, the coincidence pulse output from the threshold and mark detector 10 is shown entering a shift rate buffer 12 which contains positions. "N/4" represents a number of marks or spaces or both which can be contained in the shift rate buffer 12 at a given time. Each mark and space is, in effect, sampled four times in the present embodiment, each valid mark or space being represented by four bits in the shift rate buffer 12. It should be pointed out that a coincidence pulse or mark pulse, exiting the threshold and mark detector 10 is represented by a digital "high" signal followed by a "low" signal which, in the present embodiment, are of equal length and together extend the duration of four sample time periods. The outputs from the shift rate buffer 12 are collected into "four-tuples," i.e., N/4 groups of four outputs per group. The output lines collected as $l_1$ through $l_4$, $l_5$ through $l_8$, and so on through $l_{N-3}$ through $l_N$ feed a gating network 16 comprised of overlapping AND gates which simultaneously invert and AND each four-tuple with all preceding four-tuple inputs. As seen in FIG. 1, lines $l_{N-3}$ through $l_N$ enter a first AND gate; lines $l_{N-7}$ through lines $l_{N-4}$ and lines $l_{N-3}$ through $l_N$ all enter a second AND gate; and all lines $l_1$ through $l_N$ enter an all inclusive AND gate shown in the gating network 16. The output of each AND gate enters a corresponding shrinker 20 through 32 which, in effect, compresses the output from each gate to conform to a predetermined pulse duration. At the same time, the outputs from selected lines are compared in a second gating network which comprises a mark decoder 14. The purpose of the mark decoder 14 is to determine the presence of a mark bit from the entered data. The outputs $l_{N-3}$ through $l_N$ represent the length of one mark bit which comprises preferably two high (pulse) signals followed by two low (no pulse) signals. In one embodiment, shown in FIG. 1, the presence of a mark is determined by comparing the inverse of line $l_N$ with the signal on line $l_{N-2}$. If $l_N$ is low and $l_{N-2}$ is high a pulse is generated which enters shrinker 18 and is provided to OR gate 34. This indicates that a valid mark is present and that a clock corresponding thereto should be generated. Likewise, should the inputs to any four-tuple AND gate and all preceding four-tuple AND gates in gating network 16 be all low (indicating a sequence of spaces) a corresponding shrinker or shrinkers in gating network 16 will provide an output to OR gate 34, thereby indicating the entry of another space into the shift rate buffer 12, provided that a pulse is present in some other four-tuple in the shaft rate buffer 12. It should of course be noted, that the shift rate buffer 12 must be clocked at a frequency four times that of the frequency of mark and space data if four output lines are to correspond to a bit of entered data. Similarly, should there be eight output lines per each mark or space bit, the sampling clock rate to the shift rate buffer 12 would be eight times that of the incoming mark and space data.

Referring to the timing diagram in FIG. 5, the shift rate buffer clock is shown in the top line with the output from the detector 10 being shown immediately below the clock. The signals from the detector 10, as seen in FIG. 5, have a rise and fall time and are not of uniform duration. Further, because the detector 10 is in no way synchronized with the shift rate buffer clock, the data from the detector 10 is in no specific time relationship to the shift rate buffer clock. As the data enters the shift rate buffer 12 in the present instance, line $l_N$ will see a high level at the second clock pulse which lasts until the third clock pulse. At that time the level switches back to low until the fifth clock pulse at which time $l_N$ switches back to the high level for two clock periods. As is readily apparent from FIG. 5, each successive output line carries the same data as that carried on $l_N$, except that it is delayed in time by the appropriate number of sampling clock times. Examining the line referred to as "decoded marks," it can be seen that a mark is present on the decoded mark line during those clock periods during which $l_{N-2}$ is high and $l_N$ is low according to the logic circuitry shown in FIG. 1. Looking to the bottom line, referred to as the data derivative clock, one can see that the mark clock $M_c$ is shown having a fixed equal duration, the clock pulse being triggered at the rise of its corresponding decoded mark pulse and switched off by an appropriate shrinker (see FIG. 1).

The remaining four lines on the timing diagram relate to the detection of successive spaces. When line $l_N$ through line $l_{N-3}$ are all low, the decoded first consecutive space line provides a high output. Likewise, when line $l_N$ through lines $l_{N-7}$ are all low, the decoded second consecutive space line provides a high output. Each time one of the consecutive space lines changes to the high state, a corresponding pulse is generated on the data derivative clock line, such pulses having a fixed short duration equal to that of the data derivative clocks generated in response to the decoded marks. That is, all clock pulses on the data derivative clock line are of equal duration due to the shrinkers 18 through 32 of FIG. 1. At that instant, the output from the decoded first consecutive space line goes high. The data derivative clock line shows an output clock identified as $S_{C1}$. The output on the decoded first consecutive space line remains high for 8 sample periods. Because of the shrinker 32, the high level is abbreviated and the data derivative clocking pulse lasts considerably less than a sample period. Referring to the decoded second consecutive space line, a transition from low to high is detected at $C_{14}$ at which time lines $l_N$ through $l_{N-7}$ are all low. The transition in the decoded second consecutive space line causes a clocking on the data derivative clock line shown as $S_{C2}$. Relating the the timing diagram of FIG. 5 to the elements of FIG. 1, the output from the decoded first consecutive space line is the output from the four input AND gate of gating network 16. The output of the eight input AND gate of the gating network 16 is shown as the decoded second consecutive space line.

Because the space clocks derived on the data derivative clock line occur only when there is a transition from low to high along any one of the consecutive space lines, there are no space clocks unless a mark clock is first detected. More specifically, in order for any one of the decoded consecutive space lines to be low, a mark must have been present during some time within the memory of the shift rate buffer 12. Otherwise, the decoded consecutive space lines would all be high and no transitions would occur to cause clocking. In those instances where spaces are to be introduced prior to the first mark of a data message, a special trigger pulse can be provided for the sole purpose of generating such pre-mark space clocks.

Figures 6, 7:
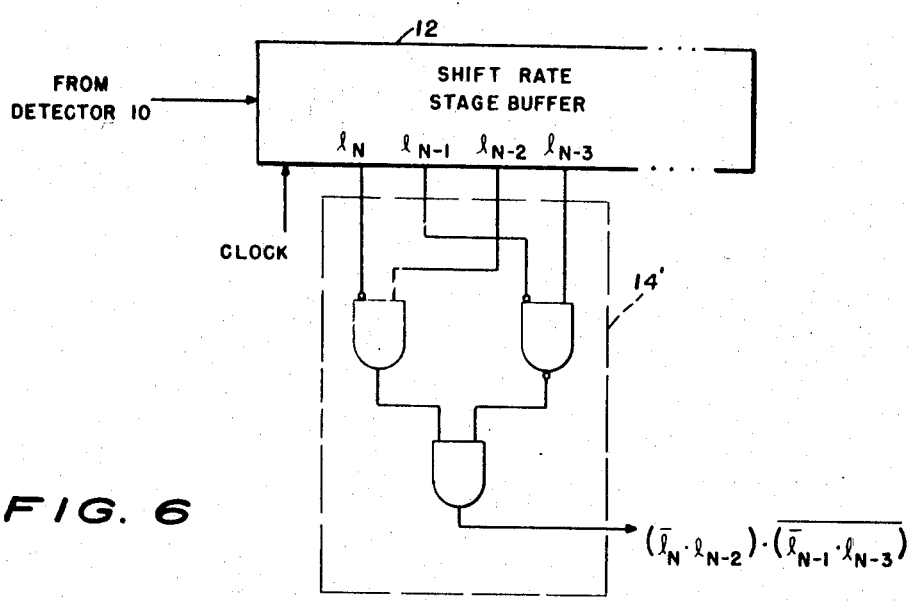
FIG. 6 shows an alternative embodiment for generating mark clocks according to the present invention.
FIG. 7 is a table comparing two logic policies contemplated by the present invention.

Referring now to FIG. 6, an alternative embodiment for indicating the presence of a mark is shown by gating network 14'. In traditional logic, the output of gating network 14' is $(\overline{l_N} \cdot l_{N-2}) \cdot (\overline{l_{N-1}} \cdot l_{N-3})$. A comparison between gating network 14 and gating network 14' is shown in FIG. 7. The different logic policies employed in FIG. 1 and in FIG. 6 reflect alternative approaches to what is considered a mark and what not according to the signal from the detector 10.

The considerations which enter into the selection of which combination of inputs will provide a clock output are several. First, ideally, a mark is represented by a high level for two sample periods followed by a low level for two sample periods. Second, as a result of signal adulteration, due to rise and fall times and other discrepancies, a mark may exist which provides a high level for one or three sample periods. It is a consideration that these marks generate a clock pulse. Third, it is important that a high level for zero or four consecutive sample periods not provide a data derivative clock indicative of a mark. Fourth, it is desirous that the likelihood of generating more than one clock during one actual mark be minimized. And, lastly, consideration of possible previous and future levels are of importance in selecting which input patterns are to generate a data derivation clock pulse. The importance of these considerations must be balanced in that all of them cannot be fully satisfied by any one algorithm.

The FIG. 1 policy, i.e., $\overline{l_N} \cdot l_{N-2}$, in FIG. 5 generates four data derived mark clocks where there are four marks from detector 10 and seven clocks in total over twenty-eight sample periods. For the undetected inputs, the FIG. 1 embodiment provides in the case of FIG. 5 an accurate clock output. However, as seen in FIG. 7, there are two sequences (i.e., 0110 and 0011) having two successive high levels which generate a mark clock. Significantly, one of the sequences could follow the other, suggesting the possibility of two data derived clocks for a single mark in some instances. The FIG. 6 policy overcomes this problem by providing only one input sequence for each condition (i.e., one, two, or three consecutive high levels) which provides a data derived mark clock pulse. In addition, the three sequences are compared to each other and with a view to possible past and future input levels to prevent multiple clocks per mark while generating a clock at each mark. A most austere policy requiring that $l_{N-2}$ and $l_{N-3}$ be high and $l_N$ and $l_{N-1}$ be low could permit only those detected marks having the precise optimal characteristic for a mark to produce a derived mark clock output. Such a policy would, however, increase the likelihood of missing actual marks which are imperfectly transmitted or improperly delayed. Further, if preceded by one or even two high levels (forming a 11100 or 111100 input), such as austere policy could cloak an improper input as an ideal mark. It should, of course, be noted that the selected policy is augmented by the circuitry of the detector 10 which, itself, prevents many of the possible, erroneous clock-producing inputs. For example, by increasing the threshold in the detector 10, the possibility of detecting valid marks lasting three sample periods can be effectively eliminated. The data derived clock is shown clocking a data register 36 into which the digital mark and space data from the threshold and mark detector 10 enters. Only that data which has been proved valid is clocked and is only clocked at the time the data is present.

It should perhaps be noted that the clock derived from the data has an average which is the same as the analog input frequency. The clock compensates for imperfections in the frequency of the analog input and insures that only valid data is entered into the data register at appropriate times.

Various modifications, adaptations and alterations to the present invention are of course possible in light of the above teachings. It should therefore be understood at this time that within the scope of the appended claims, the invention may be practiced otherwise than was specifically described hereinabove.

What is claimed is:

1. Apparatus for clocking digital marks and spaces of equal period into a data register and for deriving the data register clock directly from the digital mark and space data itself, comprising:
   means for periodically sampling the digital mark and space data a plurality (p) of times for each mark and space and for providing a digital signal corresponding to each sample, and
   means for gating the digital signals of selected samples and for generating pulses when the digital signals of the selected samples are in a desired logic configuration which indicates the presence of either a valid mark or a valid space.

2. Apparatus, as in claim 1, wherein the clock deriving means further comprises:
   shift register means having a plurality of bit positions,
   means for entering the digital signals into the bit positions of the shift register means, and
   means for continuously comparing the samples in selected bit positions to determine the presence of a mark or space.

3. Apparatus, as in claim 1, further comprising:
   means for preventing the generating of more than one clock pulse for any time interval corresponding to the length of a mark or space.

4. Apparatus, as in claim 1, wherein the sampling period of the sampling means is asynchronous with the period of the digital marks or spaces.

5. A method for entering data transmitted as an analog signal in mark and space format into a data register, comprising the steps of:
   entering the analog signal, which represents a "mark" by a sinusoid cycle of a given length and a "space" by a signal over the given length which is not the sinusoid cycle, into a detector,
   comparing the analog signal to positive threshold and negative threshold levels stored in the detector,
   generating a coincidence pulse onto a digital input line for the interval during which the positive threshold and negative threshold are exceeded by the analog signal, provided that the positive and negative excessions are in a given time relationship with respect to each other, and providing no pulse onto the digital input line when there is no coincidence, thereby generating a pulse-no pulse input on the digital input line,
   sampling the pulse-no pulse input on the digital input line at a rate at least four times the frequency of the analog mark sinusoid cycle, and gating selected samples of the pulse-no pulse input such that either a no pulse signal for a given number of samples or a predetermined pattern of pulse signals with respect to no pulse signals results in a gate output.

6. A method, as in claim 5, further comprising the steps of:
   transforming gate outputs into clock pulses of uniform amplitude and duration less than the time between samples, and
   clocking the gate outputs resulting from the presence of the predetermined pattern of pulse signals into the data register with the clock pulses.

7. A method, as in claim 5, wherein the sampling is at p times the frequency of the analog mark signal, and wherein the step of gating comprises the steps of:
   forming successive gate groups having p successive bit positions in each gate group,
   shifting samples, in sequence, through successive bit positions in a first gate group and then through successive bit positions in succeeding gate groups,
   comparing the p samples in each of the gate groups, and producing a gate output if all p samples in the first, most recent gate group show no pulse, provided a pulse is present in any sample in any other gate group.

8. A method, as in claim 7, comprising the further step of:
   producing a gate output if the first, most recent sample in the first group indicates a no pulse and the third sample in the first group indicates a pulse.

9. A method, as in claim 7, comprising the further step of:
   producing a gate output in accordance with the logic $(\overline{A} \cdot C) \cdot (\overline{B} \cdot D)$, where p equals four and A through D represent the four successive sample entries in the first gate group with A comprising the first, most recent bit position therein.

10. A method, as in claim 7, 8, or 9, further comprising the step of:
    shrinking the gate output from each gate group to provide only one clock pulse for each mark or space.

11. A method, as in claim 7, further comprising the step of:
    producing a gate output if all p samples in any number of successive gate groups starting with the first gate group show no pulse, provided a pulse is present in any sample in any other remaining gate group.

12. A method, as in claim 11, further comprising the step of:
    entering a trigger pulse during a sample time wherein the analog signal does not indicate the presence of a mark.

13. Where a mark corresponds to a specified sinusoidal cycle of a given period and amplitude and a space corresponds to such a given period where the specified sinusoidal cycle is not present, apparatus for clocking digital analog mark and space data into a digital data register, comprising:
    means for digitizing the analog mark and space data, the digitized mark corresponding to a pulse of duration which is less than or equal to one-half the given period and the digitized space corresponding to no pulse for the duration of the given period, and
    means for deriving the data register clock directly from the digitized mark and space data itself.

14. Apparatus, as in claim 13, wherein the clock deriving means comprises:
    means for generating a clock pulse for each valid mark, and
    means for generating a clock pulse for each valid space.

* * * * *